US009928982B2

(12) United States Patent
Agarwal et al.

(10) Patent No.: US 9,928,982 B2
(45) Date of Patent: Mar. 27, 2018

(54) MULTIPLE CONFIGURATION SWITCHING ASSEMBLY

(71) Applicant: Labinal, LLC, Denton, TX (US)

(72) Inventors: Archit Agarwal, Rajasthan (IN); Christopher Kenneth Wyatt, Bradenton, FL (US); Patrick Wellington Mills, Bradenton, FL (US)

(73) Assignee: LABINAL, LLC, Denton, TX (US)

( * ) Notice: Subject to any disclaimer, the term of this patent is extended or adjusted under 35 U.S.C. 154(b) by 425 days.

(21) Appl. No.: 14/621,952

(22) Filed: Feb. 13, 2015

(65) Prior Publication Data

US 2015/0235791 A1  Aug. 20, 2015

Related U.S. Application Data

(60) Provisional application No. 61/940,583, filed on Feb. 17, 2014.

(51) Int. Cl.
| | |
|---|---|
| *H02H 9/02* | (2006.01) |
| *H01H 50/54* | (2006.01) |
| *H01H 50/14* | (2006.01) |
| *H01H 50/18* | (2006.01) |

(52) U.S. Cl.
CPC ............ *H01H 50/54* (2013.01); *H01H 50/14* (2013.01); *H01H 50/18* (2013.01); *H02H 9/02* (2013.01)

(58) Field of Classification Search
CPC .................. H02H 9/02; H01L 2924/00; H01L 2924/00014
USPC .......................................................... 361/57
See application file for complete search history.

(56) References Cited

U.S. PATENT DOCUMENTS

| | | | | |
|---|---|---|---|---|
| 2,378,162 A | * | 6/1945 | Stapleton | ............... H01H 50/30 335/131 |
| 4,893,102 A | | 1/1990 | Bauer | |

FOREIGN PATENT DOCUMENTS

| | | |
|---|---|---|
| EP | 0188258 | 7/1986 |
| EP | 0279592 | 8/1988 |

OTHER PUBLICATIONS

EP-0188258; Entire specification and drawings.*

(Continued)

*Primary Examiner* — Dharti Patel
(74) *Attorney, Agent, or Firm* — Rankin, Hill & Clark LLP

(57) ABSTRACT

A switching assembly includes an operating assembly and a fixed contact assembly including a first fixed contact, a second fixed contact, a third fixed contact, a fourth fixed contact, and a number of terminals. The number of terminals includes a first terminal, a second terminal, and a third terminal. The switching assembly also includes a movable contact assembly that includes a first movable contact and a second movable contact. The first movable contact is movable between a first position and a second position. The second movable contact is movable between a first position and a second position. The operating assembly is coupled to the movable contact assembly and moves the first and second movable contact assemblies between the first and second positions. The switching assembly also includes a shunt assembly including a number of shunts. The shunt assembly is configured in one of a series configuration or a parallel configuration.

17 Claims, 3 Drawing Sheets

(56) References Cited

OTHER PUBLICATIONS

International Search Report filed in PCT/US2015/015853 dated May 27, 2015.
Chinese Office Action with English Translation dated Dec. 29, 2017, 13 pages.

* cited by examiner

MULTIPLE CONFIGURATION SWITCHING ASSEMBLY

BACKGROUND OF THE INVENTION

Field of the Invention

The disclosed and claimed concept relates to a switching assembly for aircraft and, more specifically, to a switching assembly structured to be used in a series configuration or a parallel configuration.

Background Information

The "More Electric Aircraft" is rapidly evolving. New aircraft designs are increasingly forsaking heavy, maintenance-intensive and vulnerable hydraulic and pneumatic subsystems in favor of electro hydrostatic actuators (EHAs). EHAs, which combine electric and hydraulic power, are control systems designed to enhance aircraft performance while reducing weight by eliminating tubing, pumps and valves required for aircraft with traditional controls. The existing 115 VAC and 28 VDC aircraft power supplies are not sufficient to meet the increased electric power demand. Accordingly, the aircraft industry is seeking to utilize a high voltage supply to meet power requirements. One system that appears to be suitable utilizes a 270/540 VDC power supply.

There is, therefore, a need for a switching assembly structured to be used with either a 270 VDC or a 540 VDC power supply. There is a further need for the switching assembly to utilize substantially the same components so that the switching assembly is configurable to the needed current.

SUMMARY

According to one aspect, a switching assembly includes an operating assembly and a fixed contact assembly that includes a first fixed contact, a second fixed contact, a third fixed contact, a fourth fixed contact, and a number of terminals. The number of terminals includes a first terminal, a second terminal, and a third terminal. The first terminal is coupled to, and in electrical communication with, the first fixed contact. The second terminal is coupled to, and in electrical communication with, the third fixed contact. Further, the third terminal is coupled to, and in electrical communication with, the fourth fixed contact. The switching assembly also includes a movable contact assembly that includes a first movable contact and a second movable contact. The first movable contact is movable between a first position, wherein the first movable contact is spaced from the fixed contact assembly, and a second position, wherein the first movable contact is coupled to, and in electrical communication with, the first fixed contact and the second fixed contact. The second movable contact is movable between a first position, wherein the second movable contact is spaced from the fixed contact assembly, and a second position, wherein the second movable contact is coupled to, and in electrical communication with, the third fixed contact and the fourth fixed contact. The operating assembly is coupled to the movable contact assembly and is structured to move the first movable contact assembly and the second movable contact assembly between the first and second positions. The switching assembly also includes a shunt assembly that includes a number of shunts. The shunt assembly is configured in one of a series configuration or a parallel configuration.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
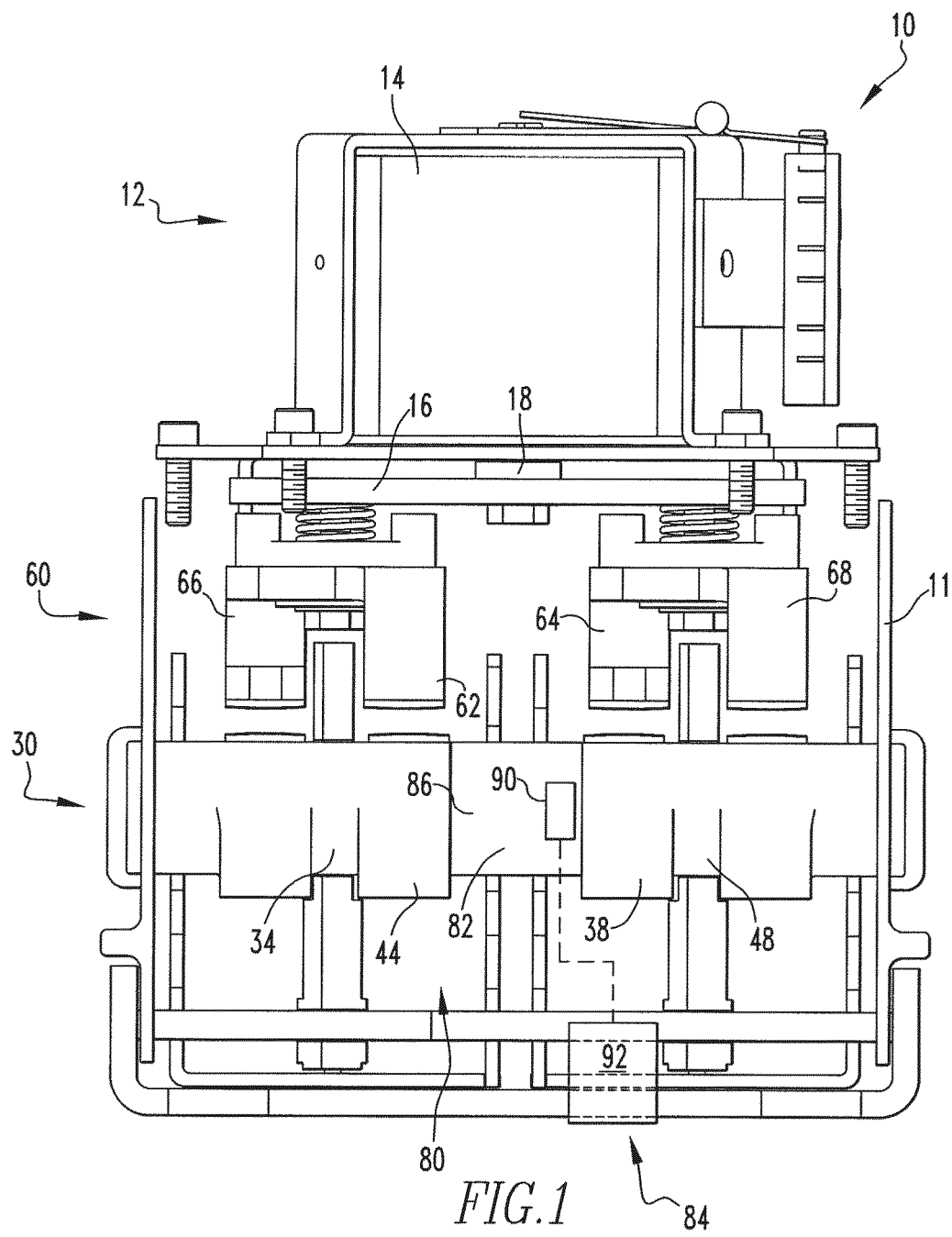
FIG. 1 is a front view of a switching assembly.
Figure 2:
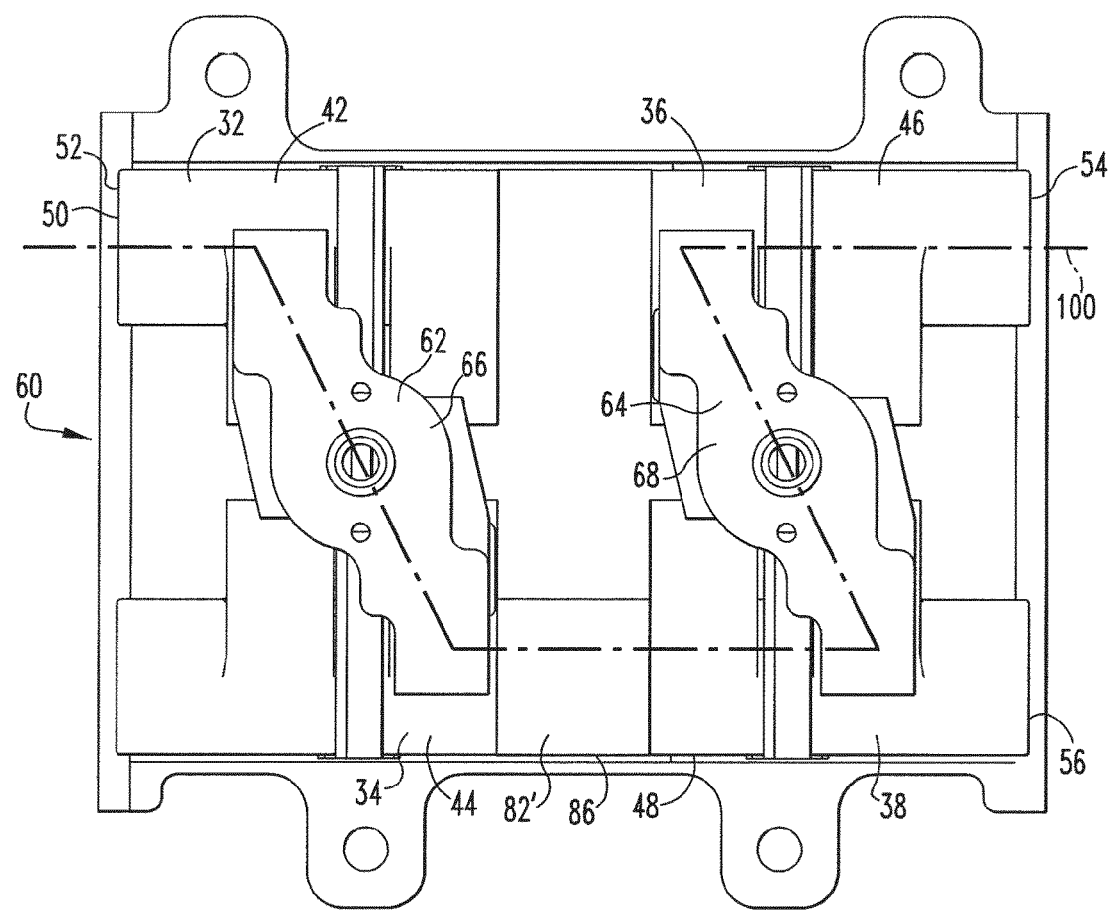
FIG. 2 is a partial top view of a switching assembly in a series configuration.
Figure 3:
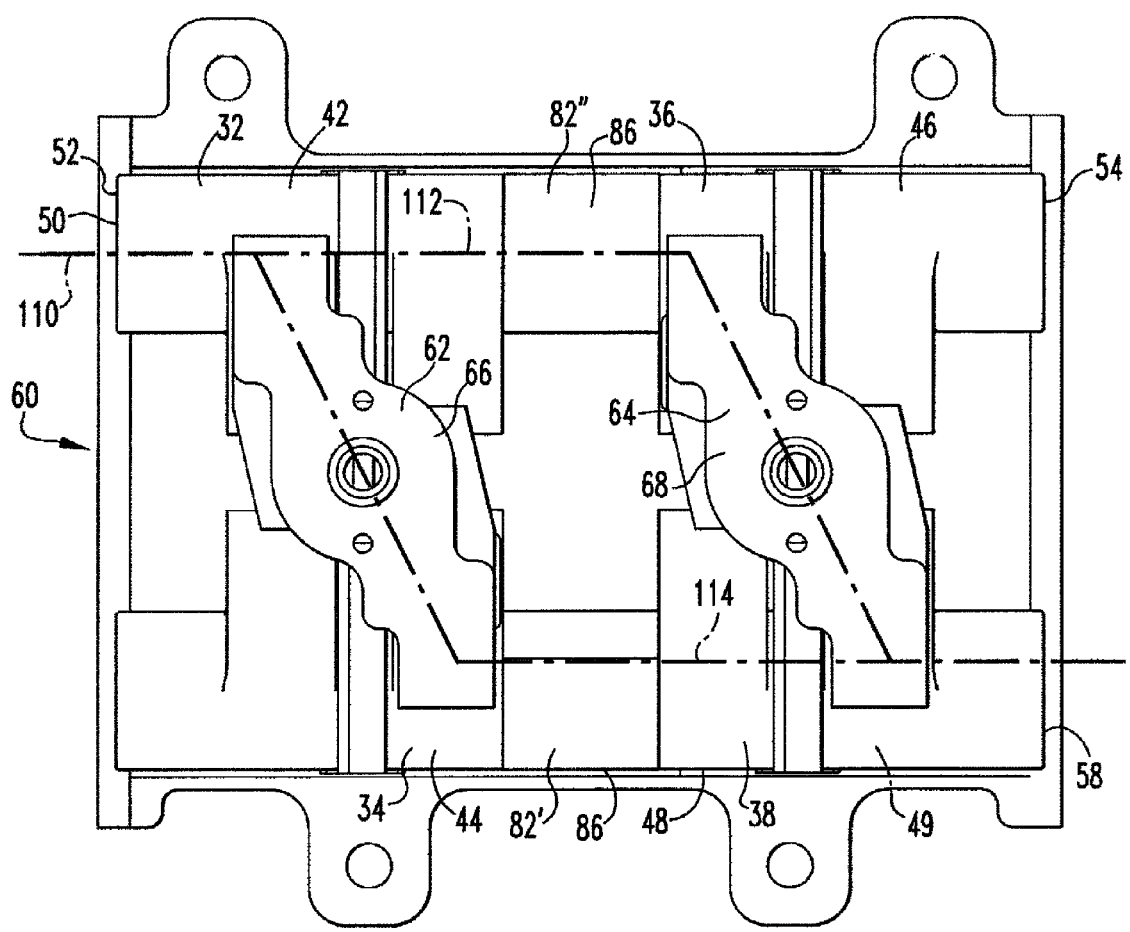
FIG. 3 is a partial top view of a switching assembly in a parallel configuration.

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof.

As used herein, the statement that two or more parts or components "engage" one another shall mean that the elements exert a force or bias against one another either directly or through one or more intermediate elements or components.

As used herein, the word "unitary" means a component is created as a single piece or unit. That is, a component that includes pieces that are created separately and then coupled together as a unit is not a "unitary" component or body.

As used herein, the term "number" shall mean one or an integer greater than one (i.e., a plurality).

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to it "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein; that is, not so close as to cause substantial friction, as with a snug fit, but with more contact and friction than a "corresponding fit," a "slightly larger" fit.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

As used herein, and when used in reference to communicating data or a signal, "in electronic communication" includes both hardline and wireless forms of communication.

As used herein, "in electric communication" means that a current passes between the identified elements.

As is shown in FIG. 1, a switching assembly 10 includes a frame assembly 11, an operating assembly 12, a fixed contact assembly 30, a movable contact assembly 60, and a shunt assembly 80. The operating assembly 12 is structured to move the movable contacts 62, 64 (discussed below) of the movable contact assembly 60 between a first position, wherein the movable contacts 62, 64 are spaced from the fixed contacts 32, 34, 36, 38 (discussed below) and a second position, wherein the movable contacts 62, 64 are coupled to, and in electrical communication with, the fixed contacts 32, 34, 36, 38. In an exemplary embodiment, the operating assembly 12 includes a solenoid 14 and a movable frame assembly 16. The solenoid 14 includes a plunger 18 and a coil (not shown). The coil is disposed about the plunger 18. The plunger 18 moves between a retracted, first position and an extended, second position. In an exemplary embodiment, the plunger 18 is biased to the first position by a spring (not shown). When the coil is charged, electromagnetic forces overcome the bias of the spring and move the plunger 18 to the second position. The movable frame assembly 16 is coupled, directly coupled, or fixed to the plunger 18 and moves therewith.

The fixed contact assembly 30 includes a first fixed contact 32, a second fixed contact 34, a third fixed contact 36, a fourth fixed contact 38, and a number of terminals 50. Further, the shunt assembly 80 is, in an exemplary embodiment, part of the fixed contact assembly 30. Each fixed contact 32, 34, 36, 38 includes a conductive body 42, 44, 46, 48, respectively. In an exemplary embodiment, the fixed contacts 32, 34, 36, 38, i.e. the fixed contact bodies 42, 44, 46, 48, have a substantially similar configuration. That is, as used herein, to have a "substantially similar configuration" means that the elements have substantially similar, or identical, dimensions and are made from substantially similar, or identical, materials. The terminals 50 include a first terminal 52, a second terminal 54, and a third terminal 56. Each terminal is structured to be coupled to a conductive member (not shown). Further, it is understood that the conductive members coupled to the terminals 50 are coupled to, and in electrical communication with, either a line (power source) or a load. In an exemplary embodiment, the switching assembly 10 operates bi-directionally, but as discussed herein, it is assumed that the line is coupled to the first terminal 52 and the load is coupled to either the second or third terminal 54, 56. It is further understood that the line conductor (not shown) carries a current as described below.

The first terminal 52 is coupled to, and in electrical communication with, the first fixed contact 32. The second terminal 54 is coupled to, and in electrical communication with, the third fixed contact 36. The third terminal 56 is coupled to, and in electrical communication with, the fourth fixed contact 38. In an exemplary embodiment, the fixed contacts 32, 34, 36, 38 are disposed in a substantially rectangular, or square, pattern. Further, in an exemplary embodiment, the fixed contact bodies 42, 44, 46, 48 are disposed in substantially the same orientation. As used herein, this configuration, i.e. elements that are equally spaced in a pattern such as, but not limited to a substantially rectangular or square pattern, with the bodies disposed in substantially the same orientation, is identified as a "substantially symmetric pattern."

The movable contact assembly 60 includes, in an exemplary embodiment, two movable contacts, a first movable contact 62 and a second movable contact 64. Each movable contact 62, 64 includes a conductive body 66, 68, respectively. In an exemplary embodiment, the movable contacts 62, 64, i.e. the movable contact bodies 66, 68, have a substantially similar configuration. The movable contacts 62, 64 are coupled, directly coupled of fixed to the movable frame assembly 16 and move therewith. The first movable contact 62 is dimensioned so as to extend between the first and second fixed contacts 32, 34. The second movable contact 64 is dimensioned so as to extend between the third and fourth fixed contacts 36, 38. In this configuration, the movable contacts 62, 64 move between a first position, wherein the movable contacts 62, 64 are spaced from the fixed contacts 32, 34, 36, 38, and a second position, wherein the movable contacts 62, 64 are coupled to, and in electrical communication with, the fixed contacts 32, 34, 36, 38. That is, when in the second position, the first movable contact 62 extends between, and is in electrical communication with, the first and second fixed contacts 32, 34, and, the second movable contact 64 extends between, and is in electrical communication with, the third and fourth fixed contacts 36, 38. The movable contacts 62, 64 are coupled to the frame assembly 16 in a "substantially symmetric pattern." That is, with two elements "substantially symmetric pattern" means the elements are substantially aligned with each other and in the same orientation.

The shunt assembly 80 includes a number of shunts 82 and a sensor assembly 84. Each shunt 82 includes a conductive body 86. Each shunt 82 is substantially similar to any other shunt 82. That is, the shunts 82 have substantially similar shapes and dimensions. In an exemplary embodiment, each shunt 82 is a generally cylindrical body. The shunts 82 are sized and dimensioned to carry a selected current. That is, the dimensions of the shunts 82 vary with the current the shunts are selected to carry.

The sensor assembly 84 includes a number of sensors 90 and an electronic circuit 92 (both shown schematically). Each sensor 90 is coupled, directly coupled or fixed, to an associated shunt 82. Each sensor 90 is structured to detect a current characteristic of the current passing through the associated shunt 82 and generate a signal representative of a characteristic that is detected. The electronic circuit 92 is coupled to and in electronic communication with each sensor 90. The electronic circuit 92, in an exemplary embodiment, is used to detect an overcurrent condition in the switching assembly 10 and supply the operating assembly 12, i.e. solenoid 14, with a signal upon detecting the overcurrent condition. In response to the signal, the operating assembly 12 moves the movable contacts 62, 64 to the first position. The switching assembly 10 is assembled as follows. As noted above, the fixed contacts 32, 34, 36, 38 are disposed in a substantially rectangular, or square, pattern and are coupled, directly coupled or fixed to the frame assembly 11. The operating assembly 12 and movable frame assembly 16 are coupled, directly coupled or fixed to the frame assembly 11 adjacent the fixed contacts 32, 34, 36, 38. As noted above, the movable contacts 62, 64 are coupled, directly coupled or fixed to the movable frame assembly 16. As further noted above, the movable contacts 62, 64 move between a first and second position relative to the fixed contacts 32, 34, 36, 38.

In an exemplary embodiment, the shunt assembly 80 is configured in one of a series configuration or a parallel configuration. In the series configuration, the shunt assembly 80 includes a first shunt 82' disposed between, and in electrical communication with, the second fixed contact 34 and the fourth fixed contact 38. Thus, there is a current path 100 that extends from the first terminal 52 to the second terminal 54. In an exemplary embodiment, the current path 100 extends through the first terminal 52, the first fixed contact 32, the first movable contact assembly 62, the second fixed contact 34, the first shunt 82', the fourth fixed contact 38, the second movable contact assembly 64, the third fixed contact 36 and the second terminal 54. As used herein, a current path 100 that "extends through" a number of elements means that the current passes through the elements in the order identified.

In the parallel configuration, the shunt assembly 80 includes a first shunt 82' disposed between, and in electrical communication with, the second fixed contact 34 and the fourth fixed contact 38, and, a second shunt 82" disposed between, and in electrical communication with, the first fixed contact 32 and the third fixed contact 36. Thus, in the parallel configuration, there is a bifurcated current path 110 that extends from the first terminal 52 to the third terminal 56. In an exemplary embodiment, the bifurcated current path 110 includes a first current path 112 and a second current path 114. The first current path 112 extends through the first terminal 52, the first fixed contact 32, the first movable contact assembly 62, the second fixed contact 34, the first shunt 82', the fourth fixed contact 38, and the third terminal 56. The second current path 114 extends through the first terminal 52, the first fixed contact 32, the second shunt 82", the third fixed contact 36, the second movable contact assembly 64, the fourth fixed contact 38, and the third terminal 56.

As noted above, the various elements through which the bifurcated current path 110 extends are disposed in a substantially symmetric pattern and have a substantially similar configuration. In this pattern and configuration, the first current path 112 and the second current path 114 can substantially equal currents. In an exemplary embodiment, and in this configuration, the parallel configuration is about a $2*V_s$ and $0.5 A_s$ configuration relative to the series configuration. That is, as used herein, "$2*V_s$ and $0.5 A_s$" means that the current passing through the switching assembly 10 when in the parallel configuration is about twice the voltage and about half the amperage of the current passing through the switching assembly 10 when in the series configuration. In an exemplary embodiment, the current passing through the switching assembly 10 when in the series configuration is about 270 VDC and about 500 amps, and, the current passing through the switching assembly 10 when in the parallel configuration is about 540 VDC and about 250 amps.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:
1. A switching assembly comprising:
an operating assembly;
a fixed contact assembly including a first fixed contact, a second fixed contact, a third fixed contact, a fourth fixed contact, and a number of terminals;
said number of terminals including a first terminal, a second terminal, and a third terminal, wherein each of said number of terminals is structured to be coupled to a conductive member that is coupled to either a line or a load;
said first terminal coupled to, and in electrical communication with, said first fixed contact;
said second terminal coupled to, and in electrical communication with, said third fixed contact;
said third terminal coupled to, and in electrical communication with, said fourth fixed contact;
a movable contact assembly including a first movable contact and a second movable contact;
said first movable contact movable between a first position, wherein said first movable contact is spaced from said fixed contact assembly, and a second position, wherein said first movable contact is coupled to, and in electrical communication with, said first fixed contact and said second fixed contact;
said second movable contact movable between a first position, wherein said second movable contact is spaced from said fixed contact assembly, and a second position, wherein said second movable contact is coupled to, and in electrical communication with, said third fixed contact and said fourth fixed contact;

said operating assembly coupled to said movable contact assembly and structured to move said first movable contact and said second movable contact between said first and second positions;
a shunt assembly including a number of shunts including a first shunt and a second shunt; and
said shunt assembly configurable in a series configuration in which the first shunt is disposed between, and in electrical communication with, said second fixed contact and said fourth fixed contact such that when said first movable contact and said second movable contact are in said second position, a current path extends from said first terminal to said second terminal, and a parallel configuration in which said first shunt is disposed between, and in electrical communication with, said second fixed contact and said fourth fixed contact, and, the second shunt is disposed between, and in electrical communication with, said first fixed contact and said third fixed contact such that when said first movable contact and said second movable contact are in said second position, a bifurcated current path extends from said first terminal to said third terminal.

2. The switching assembly of claim 1 wherein said current path extends through said first terminal, said first fixed contact, said first movable contact assembly, said, second fixed contact, said first shunt, said fourth fixed contact, said second movable contact assembly, said third fixed contact and said second terminal.

3. The switching assembly of claim 1 wherein:
said bifurcated current path includes a first current path and a second current path;
said first current path extends through said first terminal, said first fixed contact, said first movable contact assembly, said, second fixed contact, said first shunt, said fourth fixed contact, and said third terminal;
said second current path extends through said first terminal, said first fixed contact, said second shunt, said third fixed contact, said second movable contact assembly, said fourth fixed contact, and said third terminal.

4. The switching assembly of claim 1 wherein:
each of said first fixed contact, said second fixed contact, said third fixed contact, and said fourth fixed contact have a substantially similar configuration;
each of said first movable contact and said second movable contact have a substantially similar configuration; and
each shunt is substantially similar to any other shunt.

5. The switching assembly of claim 4 wherein:
said first fixed contact, said second fixed contact, said third fixed contact, and said fourth fixed contact are disposed in a substantially symmetric pattern; and
said first movable contact and said second movable contact are disposed in a substantially symmetric pattern.

6. The switching assembly of claim 1 wherein:
said shunt assembly includes a sensor assembly including a number of sensors;
each said sensor coupled to a shunt; and
each said sensor structured to detect a current characteristic of the current passing through the associated shunt.

7. The switching assembly of claim 6 wherein said sensor assembly includes a microprocessor circuit structured to measure the current passing through each shunt.

8. The switching assembly of claim 1 wherein, in relation to the series configuration, the parallel configuration is about a $2*V_s$ and 0.5 $A_s$ configuration.

9. A switching assembly comprising:
an operating assembly;
a fixed contact assembly including a first fixed contact, a second fixed contact, a third fixed contact, a fourth fixed contact, and a number of terminals;
said number of terminals including a first terminal, a second terminal, and a third terminal;
said first terminal coupled to, and in electrical communication with, said first fixed contact;
said second terminal coupled to, and in electrical communication with, said third fixed contact;
said third terminal coupled to, and in electrical communication with, said fourth fixed contact;
a movable contact assembly including a first movable contact and a second movable contact;
said first movable contact movable between a first position, wherein said first movable contact is spaced from said fixed contact assembly, and a second position, wherein said first movable contact is coupled to, and in electrical communication with, said first fixed contact and said second fixed contact;
said second movable contact movable between a first position, wherein said second movable contact is spaced from said fixed contact assembly, and a second position, wherein said second movable contact is coupled to, and in electrical communication with, said third fixed contact and said fourth fixed contact;
said operating assembly coupled to said movable contact assembly and structured to move said first movable contact and said second movable contact between said first and second positions;
a shunt assembly including a number of shunts; and
said shunt assembly configured in one of a series configuration or a parallel configuration;
wherein, in relation to the series configuration, the parallel configuration is about a $2*V_s$ and 0.5 $A_s$ configuration;
when said shunt assembly is disposed in said series configuration, a current of about 270 VDC and about 500 amps passes through said second terminal; and
when said shunt assembly is disposed in said parallel configuration, a current of about 540 VDC and about 250 amps passes through said third terminal.

10. The switching assembly of claim 9 wherein:
when said shunt assembly is disposed in said series configuration, said shunt assembly includes a first shunt disposed between, and in electrical communication with, said second fixed contact and said fourth fixed contact; and
wherein, when said first movable contact and said second movable contact are in said second position, a current path extends from said first terminal to said second terminal.

11. The switching assembly of claim 10 wherein said current path extends through said first terminal, said first fixed contact, said first movable contact assembly, said, second fixed contact, said first shunt, said fourth fixed contact, said second movable contact assembly, said third fixed contact and said second terminal.

12. The switching assembly of claim 9 wherein:
when said shunt assembly is disposed in said parallel configuration, said shunt assembly includes a first shunt and a second shunt, said first shunt disposed between, and in electrical communication with, said second fixed contact and said fourth fixed contact, and, said second shunt disposed between, and in electrical communication with, said first fixed contact and said third fixed contact; and wherein, when said first movable contact and said second movable contact are in said second position, a bifurcated current path extends from said first terminal to said third terminal.

13. The switching assembly of claim 12 wherein:

said bifurcated current path includes a first current path and a second current path;

said first current path extends through said first terminal, said first fixed contact, said first movable contact assembly, said, second fixed contact, said first shunt, said fourth fixed contact, and said third terminal;

said second current path extends through said first terminal, said first fixed contact, said second shunt, said third fixed contact, said second movable contact assembly, said fourth fixed contact, and said third terminal.

14. The switching assembly of claim 9 wherein:

each of said first fixed contact, said second fixed contact, said third fixed contact, and said fourth fixed contact have a substantially similar configuration;

each of said first movable contact and said second movable contact have a substantially similar configuration; and each shunt is substantially similar to any other shunt.

15. The switching assembly of claim 14 wherein:

said first fixed contact, said second fixed contact, said third fixed contact, and said fourth fixed contact are disposed in a substantially symmetric pattern; and said first movable contact and said second movable contact are disposed in a substantially symmetric pattern.

16. The switching assembly of claim 9 wherein:

said shunt assembly includes a sensor assembly including a number of sensors;

each said sensor coupled to a shunt; and each said sensor structured to detect a current characteristic of the current passing through the associated shunt.

17. The switching assembly of claim 16 wherein said sensor assembly includes a microprocessor circuit structured to measure the current passing through each shunt.

* * * * *